L. MEYER.
SEPARATOR.
APPLICATION FILED OCT. 6, 1910.

1,007,722.

Patented Nov. 7, 1911.

2 SHEETS—SHEET 1.

Attest:
H. G. Fletcher.
E. L. Wallace.

Inventor:
Louis Meyer.
By Higdon & Longan
Attys.

L. MEYER.
SEPARATOR.
APPLICATION FILED OCT. 6, 1910.

1,007,722.

Patented Nov. 7, 1911.

2 SHEETS—SHEET 2.

attest:
H. G. Fletcher
E. L. Wallace

Inventor:
Louis Meyer.
By Higdon & Longan
attys

UNITED STATES PATENT OFFICE.

LOUIS MEYER, OF ST. LOUIS, MISSOURI.

SEPARATOR.

1,007,722. Specification of Letters Patent. Patented Nov. 7, 1911.

Application filed October 6, 1910. Serial No. 585,591.

*To all whom it may concern:*

Be it known that I, LOUIS MEYER, a citizen of the United States, and resident of St. Louis, Missouri, have invented certain new and useful Improvements in Separators, of which the following is a specification, containing a full, clear, and exact description, reference being had to the accompanying drawings, forming a part hereof.

My invention relates to improvements in separators and is especially directed to the construction in hanging of the pans of the separator, the object of my invention being to construct pans of unequal lengths and weights and to arrange the racks in such manner as to more evenly balance the pans, thereby reducing the wear and hammer of the parts when in operation.

A further object of my invention is to construct the pans of a separator in such manner as to increase their efficiency by reason of increased vibrating movements of the racks which increased vibrating movements are obtained without an expenditure of additional energy.

For the above purposes my invention consists in certain novel features of construction and arrangement of parts, as will be hereinafter more fully described, pointed out in the claims and illustrated by the accompanying drawings, in which—

Figure 1:
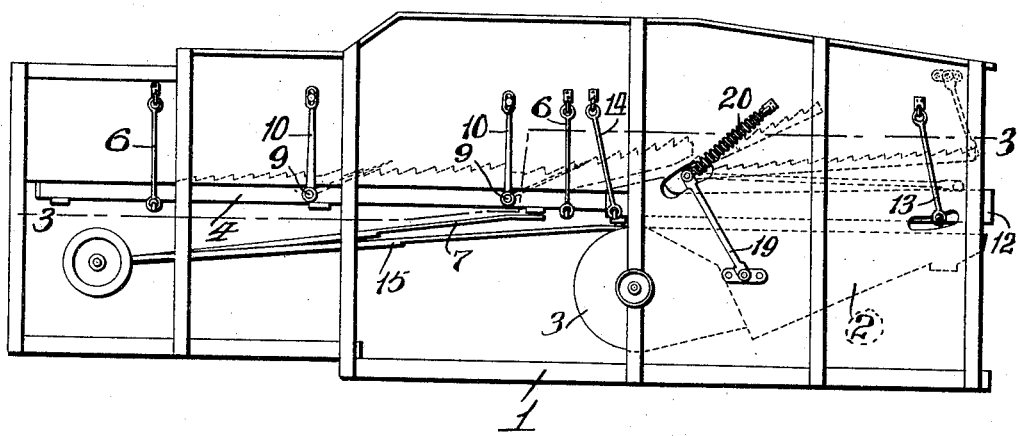
Figure 2:
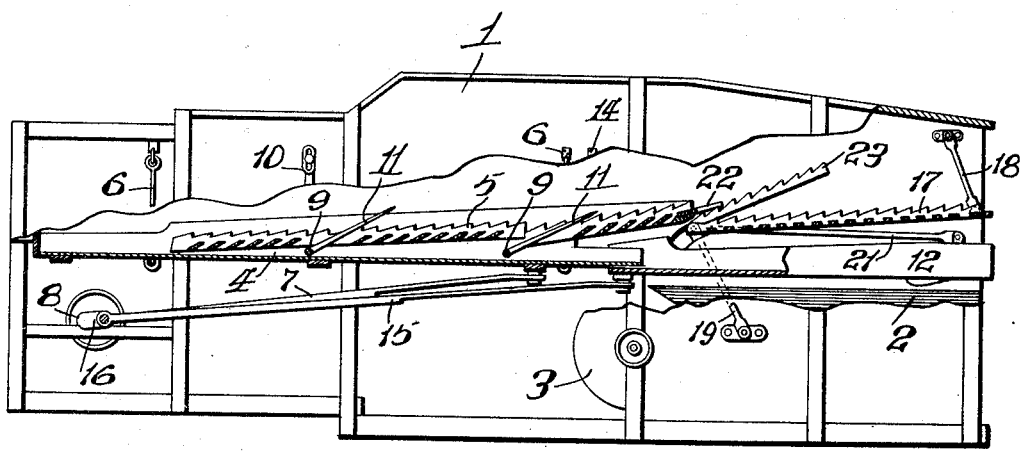
Figure 3:
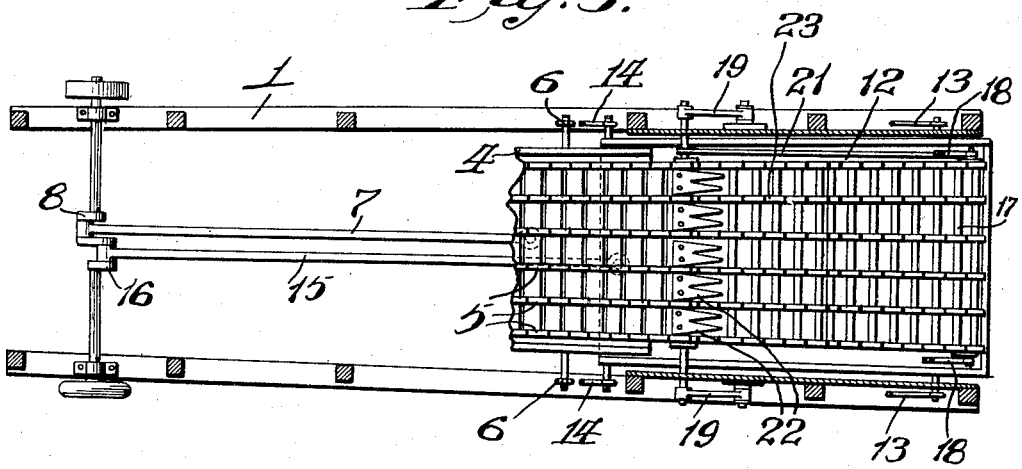
Figure 4:
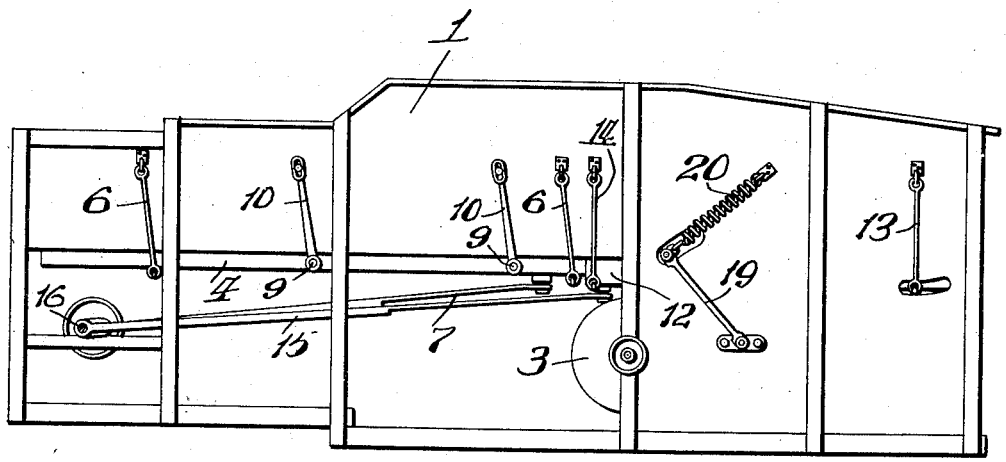

Figure 1 is a side elevation of a separator equipped with my improved pans, which are shown in their normal or starting position, the hangers of the first pan being in a vertical position; Fig. 2 is an elevation, partly in section, and shows the pans in the same position as in Fig. 1; Fig. 3 is a horizontal sectional plan taken on the line 3—3 of Fig. 1; and Fig. 4 is a view similar to Fig. 1 and shows the hangers for the pans in shifted positions relative to the positions shown in Fig. 1.

Referring by numerals to the accompanying drawings: 1 designates the separator frame, 2 the separator shoe and 3 the fan-casing, all of which parts are or may be of ordinary construction.

The first or larger pan comprises the grain-bottom 4, the straw rack 5 which consists of cross slats carried by and movable with the grain-bottom and the fish backs also carried by and movable with the grain-bottom, the pan being supported by hangers such as 6 which are on the outside of the separator frame and comprise the rods having an eye at each end, the hooks carried by the grain-bottom and the eyes secured to the separator frame. A hanger such as described is arranged adjacent each end of the pan. This pan is moved by means of a pitman such as 7 which is connected with the pan and the crank 8.

Arranged transversely of the grain-bottom are shafts 9 which project beyond the sides of the grain-bottom where they connect with rods 10 pivotally secured to the separator frame. Each of the shafts 9 carries a number of lifting fingers 11.

12 designates the rearmost pan, generally termed the chaffer, which is suspended at its rearmost end by the hangers 13 and suspended at its forward end by hangers 14. The chaffer receives its motion from a pitman 15 connecting the chaffer with a crank 16, which crank 16 is preferably integral with the crank 8 operating the forward pan.

Arranged above the chaffer 12 is a vibrating straw rack 17 comprising cross slats and fish backs of ordinary construction. This vibrating straw rack is suspended at its rear end by hangers 18 preferably arranged on the inside of the separator frame and supported at its forward end upon rods 19 preferably arranged on the exterior of the separator frame, there necessarily being openings in the separator frame to accommodate parts of the hanger connecting the hanger proper with the vibrating straw rack. On each side of the separator frame there is a coil spring such as 20 for controlling the movements of the vibrating straw rack.

To impart motion to the vibrating straw rack, I have provided a pitman 21 connecting the chaffer with the straw rack so that upon a movement of the chaffer there will be a corresponding movement of the vibrating straw rack.

As shown in Fig. 2 of the drawing, the straw rack carried by the forward pan projects rearwardly beyond the grain-bottom and the vibrating straw rack, operable by the chaffer, is of less length than the chaffer and, for the reason that at times the two straw racks are separated some considerable distance, I provide the bifurcated fingers 22 for carrying the straw over the space between the racks.

Carried by the vibrating straw rack at its forward end is an auxiliary elevating rack 23 which inclines rearwardly and upwardly so that when the straw passes thereover it has a considerable fall from the rearmost end of the auxiliary elevating rack to the vibrating straw rack proper.

As previously stated the pans in my separator are, for several well known reasons, constructed of uneven lengths, sizes and weights, which pans operate in opposite directions, that is, when the foremost pan is moving rearwardly the rearmost pan is moved forwardly, and, by reason of their unequal sizes and weights are not evenly balanced, hence there will be a hammering of the crank connections.

By reason of the differences in positions of the hangers of the different pans, the rearmost pan will be elevated when the foremost pan is descending. In other words, when the longer pan moves from a position with its hangers vertical and moving either forwardly or rearwardly the longer pan will be elevated, giving the straw and grain a pitching motion, by which it is carried to the rear of the separator. During the movement of this longer pan, which is the heavier one, the rear pan or pan of less weight, moves from its highest level toward the first pan until it has traveled its distance where it comes to its lowermost level and at this point the first pan will be at its highest level, hence it will be seen by this movement the two pans of uneven weight and size swinging backward and forward in opposite directions are unevenly balanced, the pans being moved by the double crank 8 and 16 by means of the connecting pitmen attached to the pans and the crank. It will be further seen that this unbalanced movement is detrimental to the smooth operation of the separator, especially is this true of a separator having a double crank and connecting rods, giving them a jarring motion and uneven wearing. To overcome this objectionable feature, I have provided the special straw rack 17 which is attached to the rear and lighter pan in such manner that it is driven by said pan and in the same direction as the said pan and has a vibration from, say, two and one-half to three inches, according to its adjustment, this rack being made of sufficient weight that, when the rear lighter pan moves, the rack is moved with it, the energy required in moving the rearmost pan and rack being about equal to the energy required to move the foremost or heavier pan, thereby balancing, as nearly as possible, the two pans. This construction not only gives to the machine a perfect balancing, but a better separation of the grain from the straw is obtained.

The straw passes over the first pan having, what I term, a stationary straw rack, where it is received on a set of bifurcated fingers 22 and carried over the space between the two racks while apart where the straw is held aloft over said opening between the racks until it is received by the vibrating auxiliary elevating rack 23, over which the straw travels and where it drops off to a lower level on to the vibrating straw rack proper whereby the straw receives a good beating while passing over the vibrating rack, taking out any grain that may have been left in the straw while passing over the rack in the first pan then passing over to a wind-stacker fan, (not shown).

I claim:

1. In a separator, a pan having a rack secured thereto and carried thereby, a swinging support for said pan, a second pan, of less weight than the first mentioned pan, arranged below and adapted to receive the discharge from said first mentioned pan, a swinging support for said second pan, an independent second rack, a hanger for suspending said second rack over said second pan, a pivotal connection between said second pan and said second rack for causing them to move together in the same direction, a driven shaft, a pitman connected with each of said pans and to said driven shaft at opposed points of connection, whereby on the rotation of said driven shaft the work imposed on said shaft at said points of connection is equalized.

2. In a separator, a pan having a rack secured thereto and carried thereby, a swinging support for said pan, a second pan, of less weight than the first mentioned pan, arranged below and adapted to receive the discharge from said first mentioned pan, a swinging support for said second pan, an independent second rack arranged below and adapted to receive the discharge from the rack carried by the first mentioned pan, a hanger for suspending said second rack over said second pan, a pivotal connection between said second pan and said second rack for causing them to move together in the same direction, a driven shaft, a pitman connected with each of said pans and to said driven shaft at opposed points of connection, whereby on the rotation of said driven shaft, the said pans are caused to move in opposite directions and the second rack is caused to move together in a direction with the second pan and to move bodily up and down, thus imposing on the driven shaft during its rotation, at its opposed points of connection with the pitmen, an equal amount of work.

In testimony whereof, I have signed my name to this specification, in presence of two subscribing witnesses.

LOUIS MEYER.

Witnesses:
E. E. LONGAN,
E. L. WALLACE.

Copies of this patent may be obtained for five cents each, by addressing the "Commissioner of Patents, Washington, D. C."